United States Patent
Moran et al.

(10) Patent No.: US 9,840,350 B2
(45) Date of Patent: Dec. 12, 2017

(54) PALLET TRUCK WITH INTEGRATED HALF-SIZE PALLET SUPPORT

(71) Applicant: Crown Equipment Corporation, New Bremen, OH (US)

(72) Inventors: Michael J. Moran, Winterville, NC (US); Brad A. Halbert, St. Marys, OH (US); David A. Hickman, Winterville, NC (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 14/930,960

(22) Filed: Nov. 3, 2015

(65) Prior Publication Data
US 2016/0122077 A1 May 5, 2016

Related U.S. Application Data
(60) Provisional application No. 62/075,473, filed on Nov. 5, 2014.

(51) Int. Cl.
*B62D 21/14* (2006.01)
*B65D 19/38* (2006.01)
*B62B 3/06* (2006.01)

(52) U.S. Cl.
CPC ............ *B65D 19/38* (2013.01); *B62B 3/06* (2013.01); *B62B 2203/20* (2013.01); *B65D 2519/00771* (2013.01); *B65D 2519/00796* (2013.01)

(58) Field of Classification Search
CPC .................. B65D 19/38; B65D 19/00; B65D 2519/00796; B65D 2519/00771; B62B 3/06; B62B 3/04; B62B 3/0612; B62B 2203/20; B62B 2205/33; B62B 2205/30;
(Continued)

(56) References Cited

U.S. PATENT DOCUMENTS

| 2,610,751 A | 9/1952 | Bevan |
| 2,639,051 A | 5/1953 | Thomas |
| 2,698,698 A | 1/1955 | Smith et al. |

(Continued)

FOREIGN PATENT DOCUMENTS

| GB | 667585 A | 3/1952 |
| GB | 1061167 A | 3/1967 |

OTHER PUBLICATIONS

Wochinz, Reinmar; International Search Report and Written Opinion of the International Searching Authority; International Application No. PCT/US2015/058754; Jan. 14, 2016; European Patent Office; Rijswijk, Netherlands.
(Continued)

*Primary Examiner* — James M Dolak
(74) *Attorney, Agent, or Firm* — Stevens & Showalter, LLP

(57) ABSTRACT

The present application discloses a pallet truck backrest assembly for handling half-size pallets. A first half-size pallet support is pivotally coupled to a backrest of the backrest assembly at a first height and a second half-size pallet support is pivotally coupled to the backrest at a second height with the second height being less than the first height. The half-size pallet supports pivot between first positions against the backrest and second positions extending over the forks of the pallet truck to accommodate half-size pallets.

16 Claims, 12 Drawing Sheets

(58) Field of Classification Search
CPC ........ B62B 2205/32; B66F 9/12; B66F 9/075; B66F 9/07504; B66F 9/06
See application file for complete search history.

(56) References Cited

U.S. PATENT DOCUMENTS

| | | | |
|---|---|---|---|
| 2,827,189 A | 3/1958 | Knudstrup | |
| 3,080,080 A | 3/1963 | Miller | |
| 3,176,866 A | 4/1965 | Meister, Jr. | |
| 3,258,146 A | 6/1966 | Hamilton | |
| 3,310,189 A | 3/1967 | Vander Wal | |
| 3,392,858 A | 7/1968 | Fernstrom et al. | |
| 3,477,600 A | 11/1969 | Sawyer | |
| 3,737,060 A | 6/1973 | Shaffer | |
| 3,758,075 A | 9/1973 | Briggs | |
| 3,966,067 A | 6/1976 | Reese | |
| 4,149,644 A | 4/1979 | Fuller | |
| 4,239,446 A | 12/1980 | Vucinic | |
| 4,300,867 A | 11/1981 | Frees | |
| 4,395,189 A | 7/1983 | Munten | |
| 4,422,819 A | 12/1983 | Guest | |
| 4,448,434 A | 5/1984 | Anderson | |
| 4,526,399 A | 7/1985 | Holtz | |
| 4,619,579 A * | 10/1986 | Frison | B66F 9/12 187/237 |
| 4,632,627 A | 12/1986 | Swallows | |
| 4,708,576 A | 11/1987 | Conley | |
| 4,884,936 A * | 12/1989 | Kawada | B62B 3/04 280/43.12 |
| 4,886,284 A | 12/1989 | Martinez, Jr. | |
| 5,073,077 A | 12/1991 | Altman | |
| 5,139,385 A | 8/1992 | Chase et al. | |
| 5,174,708 A | 12/1992 | Ruder et al. | |
| 5,207,439 A | 5/1993 | Mortenson | |
| 5,365,860 A | 11/1994 | Billington, III | |
| 5,403,024 A | 4/1995 | Frketic | |
| 5,692,583 A | 12/1997 | Reed et al. | |
| 5,716,183 A | 2/1998 | Gibson et al. | |
| 5,752,584 A | 5/1998 | Magoto et al. | |
| 5,897,286 A | 4/1999 | Whittaker | |
| 6,015,255 A | 1/2000 | Vander Meer | |
| 6,033,177 A | 3/2000 | Kooima | |
| 6,135,466 A | 10/2000 | Irwin | |
| 6,174,124 B1 * | 1/2001 | Haverfield | B66F 9/06 182/148 |
| D465,634 S | 11/2002 | Botzau et al. | |
| 6,595,306 B2 | 7/2003 | Trego et al. | |
| 6,709,222 B2 | 3/2004 | Inman, Jr. | |
| 7,165,776 B2 * | 1/2007 | Quinlan, Jr. | B66F 7/08 211/207 |
| 7,380,769 B1 | 6/2008 | Dorris | |
| 7,744,335 B1 | 6/2010 | Cleary | |
| 7,823,893 B2 | 11/2010 | Meyers et al. | |
| 7,856,932 B2 | 12/2010 | Stahl et al. | |
| 7,865,286 B1 | 1/2011 | Hall | |
| 7,987,797 B2 | 8/2011 | Stahl et al. | |
| 7,988,405 B2 | 8/2011 | Ellington | |
| 8,011,677 B1 | 9/2011 | Ellington et al. | |
| 8,078,368 B2 | 12/2011 | Hall | |
| 8,282,111 B2 | 10/2012 | Hailston et al. | |
| 8,376,089 B2 * | 2/2013 | Stone | B66F 9/06 180/19.2 |
| 8,632,296 B1 | 1/2014 | Binford et al. | |
| 8,651,797 B2 | 2/2014 | Magoto | |
| 8,944,744 B2 | 2/2015 | Kleeberger et al. | |
| 8,979,099 B1 * | 3/2015 | Ellis | B66F 9/142 280/43.12 |
| 9,227,824 B2 * | 1/2016 | Philipopoulos | B66F 9/12 |
| 9,457,999 B2 * | 10/2016 | Belotti | B66F 9/165 |
| 9,458,000 B2 * | 10/2016 | Richard | B66F 9/12 |
| 2003/0197351 A1 | 10/2003 | Burger et al. | |
| 2004/0265113 A1 | 12/2004 | Quinlan, Jr. et al. | |
| 2005/0129494 A1 | 6/2005 | Chandler et al. | |
| 2007/0210542 A1 | 9/2007 | Hammond | |
| 2009/0183953 A1 | 7/2009 | Ellington | |
| 2009/0185890 A1 | 7/2009 | Ellington | |
| 2010/0295261 A1 | 11/2010 | Ellington | |
| 2011/0091305 A1 | 4/2011 | Preesman et al. | |
| 2011/0170999 A1 | 7/2011 | Hailston | |
| 2011/0171000 A1 * | 7/2011 | Hailston | B62B 3/06 414/607 |
| 2011/0206489 A1 | 8/2011 | Ford et al. | |
| 2013/0202400 A1 | 8/2013 | Richard et al. | |
| 2015/0217979 A1 | 8/2015 | Richard et al. | |
| 2015/0298951 A1 | 10/2015 | Apps et al. | |
| 2016/0207554 A1 | 7/2016 | Johnson et al. | |

OTHER PUBLICATIONS

Information pertaining to Potential Public Disclosure set forth in the IDS Cover Letter mailed together with the present Information Disclosure Statement on Jun. 16, 2016, 2 pages.
Yukari Nakamura; International Preliminary Report on Patentability; International Application No. PCT/US2015/058754; May 9, 2017; International Bureau of WIPO; Geneva, Switzerland.
"PTH 50 Series Specifications Sheet," 3 pages; created on Oct. 24, 2007; retrieved from http://web.archive.org/web/20071214011253/ http://www.crown.com/usa/products/pdfs/specs/hand_pallet_trucks_pth50_spec.pdf.
PowerPoint presentation; "Beverage Delivery Research"; dated Aug. 15, 2013; Crown Equipment Corporation, New Bremen, Ohio.
PowerPoint presentation; "Beverage Delivery Research"; dated Sep. 4, 2013; Crown Equipment Corporation, New Bremen, Ohio.
Information pertaining to Public Disclosure set forth in the IDS Cover Letter submitted together with an Information Disclosure Statement on Jul. 12, 2017, 2 pages.

* cited by examiner

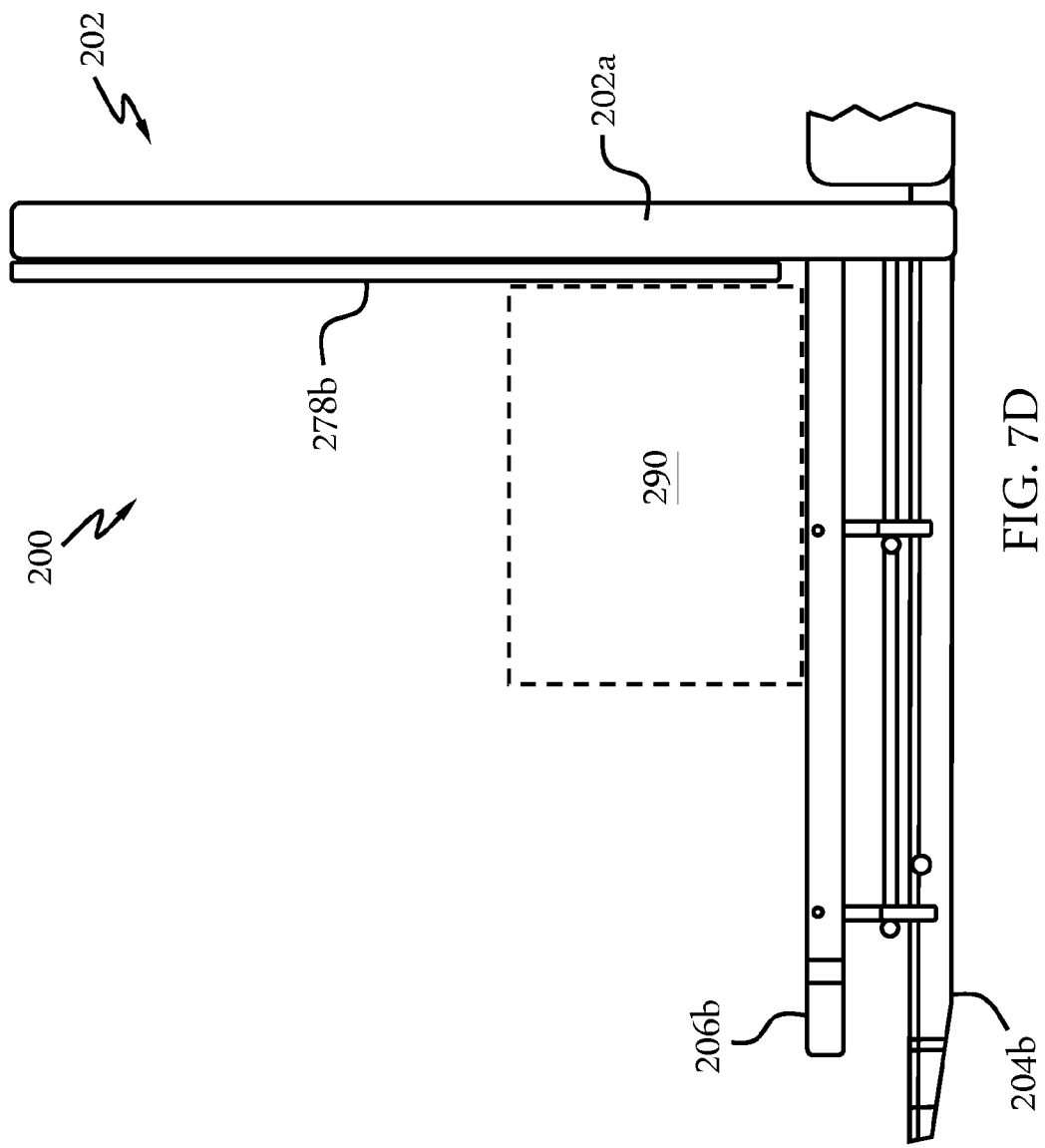

PALLET TRUCK WITH INTEGRATED HALF-SIZE PALLET SUPPORT

RELATED APPLICATIONS

This application claims the benefit of U.S. Provisional Application No. 62/075,473, filed Nov. 5, 2014, which is herein incorporated by reference in its entirety.

FIELD OF THE INVENTION

The disclosure of the present application relates generally to pallet trucks, and more particularly, to a pallet truck with integrated half-size pallet supports.

BACKGROUND OF THE INVENTION

Pallet trucks are one of the most common materials handling vehicles in use today and may include, for example, fork lift trucks, pallet jacks, and similar vehicles. Pallet trucks are utilized in a wide variety of businesses involved in product manufacturing, distribution, and retailing where large products or large packages of products need to be loaded, unloaded, and moved around a facility.

Pallet trucks have utilized detachable or modular adapters to customize the platform or forks to accommodate a particular type or brand of product or pallet design. These detachable or modular adapters are generally installed and removed as needed. In addition, when the adapters are not in use, they are typically removed and must be stored in the facility where the pallet truck is being used. For example, a pallet truck adapter for supporting half-size pallets is disclosed in U.S. Published Patent Application No. 2013/0202400 (US'400). When fitted onto the forks of a pallet truck, the adapter of US'400 provides pallet supports having differing heights to facilitate half-size pallet handling by lifting a half-size pallet on the higher support, lifting it slightly off of the supporting surface, and then moving to and lifting another half-size pallet on the lower support. The adjacent pallets can then be moved together and off loaded at different locations, unloading the pallet on the lower shoe first, and the pallet on the higher shoe thereafter.

SUMMARY OF THE INVENTION

In accordance with the teachings of the present application, half-size pallet supports are integrated into a pallet truck backrest assembly so that the supports can be extended over forks of the pallet truck for use or stored within a nest weldment of the backrest assembly when not in use. Advantageously when compared to existing detachable or modular adapters, there is no need to maintain a separate storage space for the supports. Also, a pallet truck having the integrated half-size pallet supports of the present application can be quickly converted from handling full size pallets, with the supports stored on the pallet truck, to handling half-size pallets, with one or more of the supports deployed, without the need to travel to a storage location and retrieve or deposit an adapter saving operator time.

In accordance with one aspect of the invention, a backrest assembly is disclosed for enabling a pallet truck to handle half-size pallets. The backrest assembly comprises a backrest attachable to a pallet truck and extending above first fork and second forks of the pallet truck. A first half-size pallet support may be pivotally coupled to the backrest at a first height relative to a bottom surface of the backrest, and a second half-size pallet support may be pivotally coupled to the backrest at a second height relative to the bottom surface of the backrest, with the second height being less than the first height. The first half-size pallet support may pivot between a first position against the backrest and a second position extending over the first fork of the pallet truck at a first support surface height, and the second half-size pallet support may pivot between a first position against the backrest and a second position extending over the second fork of the pallet truck at a second support surface height.

In accordance with some aspects of the invention, the backrest may comprise an outer frame and grid structure secured to the outer frame such that the backrest defines a nest weldment for receiving the first and second half-size pallet supports. In accordance with a particular aspect, the pallet truck backrest assembly may further comprise a first latching assembly for securing the first half-size pallet support to the backrest when the first half-size pallet support is in the first position against the backrest and a second latching assembly for securing the second half-size pallet support to the backrest when the second half-size pallet support is in the first position against the backrest. In accordance with further aspects of the invention, the first latching assembly may comprise a first backrest latch member and an inter-mating first half-size pallet support latch member, and the second latching assembly may comprise a second backrest latch member and an inter-mating second half-size pallet support latch member. Because the presently disclosed half-size pallet supports may be stored within the nest weldment of the pallet truck backrest assembly when not in use, there is no need to maintain a separate storage space as required by bulky detachable or modular adapters. In addition, there is no need to interrupt load handling operations to install or remove the half-size pallet supports.

In accordance with other aspects of the invention, the pallet truck backrest assembly may further comprise a first prop assembly movable from a collapsed position against the first half-size pallet support to a deployed position extending from the first half-size pallet support to the first fork of the pallet truck, and a second prop assembly movable from a collapsed position against the second half-size pallet support to a deployed position extending from the second half-size pallet support to the second fork of the pallet truck. In accordance with particular aspects of the invention, the collapsed position of the first prop assembly may be within the first half-size pallet support and the collapsed position of the second prop assembly may be within the second half-size pallet support.

In accordance with additional aspects of the invention, the first prop assembly may comprise a first prop leg pivotally connected at a first end to the first half-size pallet support and a first control rod pivotally connected to the backrest and pivotally connected to the first prop leg such that as the first half-size pallet support is pivoted from the first position to the second position, the first prop assembly is moved from the collapsed position to the deployed position. The second prop assembly may comprise a first prop leg pivotally connected at a first end to the second half-size pallet support and a second control rod pivotally connected to the backrest and pivotally connected to the second prop leg such that as the second half-size pallet support is pivoted from the first position to the second position, the second prop assembly is moved from the collapsed position to the deployed position.

In accordance with further aspects of the invention, the first prop assembly may further comprise a second prop leg pivotally connected at a first end to the first half-size pallet support and pivotally connected to the first control rod such that as the first half-size pallet support is pivoted from the first position to the second position, the first prop assembly including the first prop leg and the second prop leg is moved from the collapsed position to the deployed position. The second prop assembly may further comprise a second prop leg pivotally connected at a first end to the second half-size pallet support and pivotally connected to the second control rod such that as the second half-size pallet support is pivoted from the first position to the second position, the second prop assembly including the first prop leg and the second prop leg is moved from the collapsed position to the deployed position.

In accordance with still further aspects of the invention, the backrest assembly may further comprise a mechanism for assisting an operator of the pallet truck in moving the first and second half-size pallet supports between the first position and the second position. The assistance mechanism may comprise at least one gas spring coupled between an underside of each of the first and second half-size pallet supports and their respective first and second control rods.

In accordance with another aspect of the invention, the pallet truck backrest assembly may further comprise a first door and a second door movably coupled to the backrest and each having a closed position and an open position, in which the first door encloses the first half-size pallet support when it is in the first position against the backrest and the second door encloses the second half-size pallet support when it is in the first position against the backrest. In accordance with a particular aspect of the invention, the first and second doors may each comprise a handle assembly that comprises a recessed handle attached to a respective one of the first and second doors and a first tab extending from the backrest. Each recessed handle engages a respective one of the first tabs to secure the first and second doors to the backrest in the closed position.

In accordance with an additional aspect of the invention, the first and second half-size pallet supports each comprise a first opening extending through a thickness and corresponding to the respective first tab such that the first tabs extend through a respective one of the first openings when the first and second half-size pallet supports are in the first position against the backrest. In accordance with a further aspect of the invention, the backrest further comprises a second tab extending from the backrest, and the first and second half-size pallet supports each comprise a second opening extending through a thickness and corresponding to the respective second tab. When the first and second half-size pallet supports are in the first position against the backrest, the second tabs extend through a respective one of the second openings. The first and second tabs are also configured to provide support to the first and second doors when the first and second doors are in the closed position.

In accordance with an additional aspect of the invention, the first and second doors may each be formed to conform to a shape defined by an outline of the outer frame of the backrest. In accordance with a further aspect of the invention, the backrest assembly may further comprise a central column secured to at least one of the nest weldment and the outer frame and extending above the first and second forks. The central column is located along a centerline of the pallet truck and is positioned between the first and second half-size pallet supports. In accordance with still further aspects of the invention, the first and second doors may be substantially parallel to the backrest when in the closed position. In accordance with a particular aspect of the invention, the first and second doors may form a substantially planar load support surface when the first and second doors are in the closed position.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIGS. 7A-7D are perspective and side views of a backrest assembly in accordance with the teachings of the present application wherein the half-size pallet supports are secured behind doors located on the backrest.

DETAILED DESCRIPTION OF THE INVENTION

In the following detailed description, reference is made to the accompanying drawings that form a part hereof and in which is shown by way of illustration, and not by way of limitation, a specific embodiment in which the invention may be practiced. It is to be understood that other embodiments may be utilized and that changes may be made without departing from the spirit and scope of the present invention.

Figure 1:
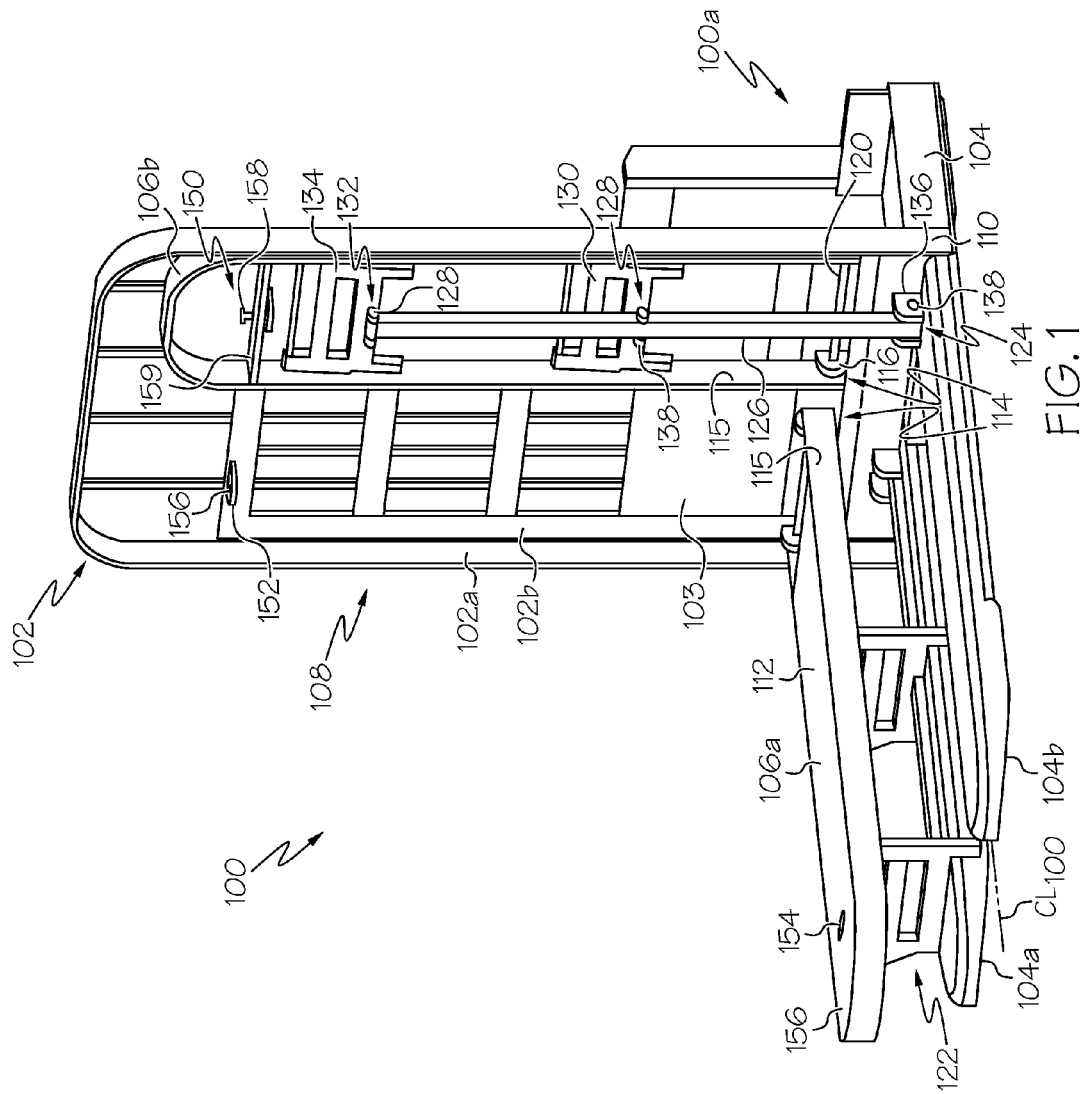
FIG. 1 is a perspective view of a backrest assembly for a pallet truck illustrating a first half-size pallet support extended over a first one of the truck's forks and a second half-size pallet support secured against a backrest of the assembly so that half-size pallet supports are integrated into the truck in accordance with the teachings of the present application.
Figure 2:
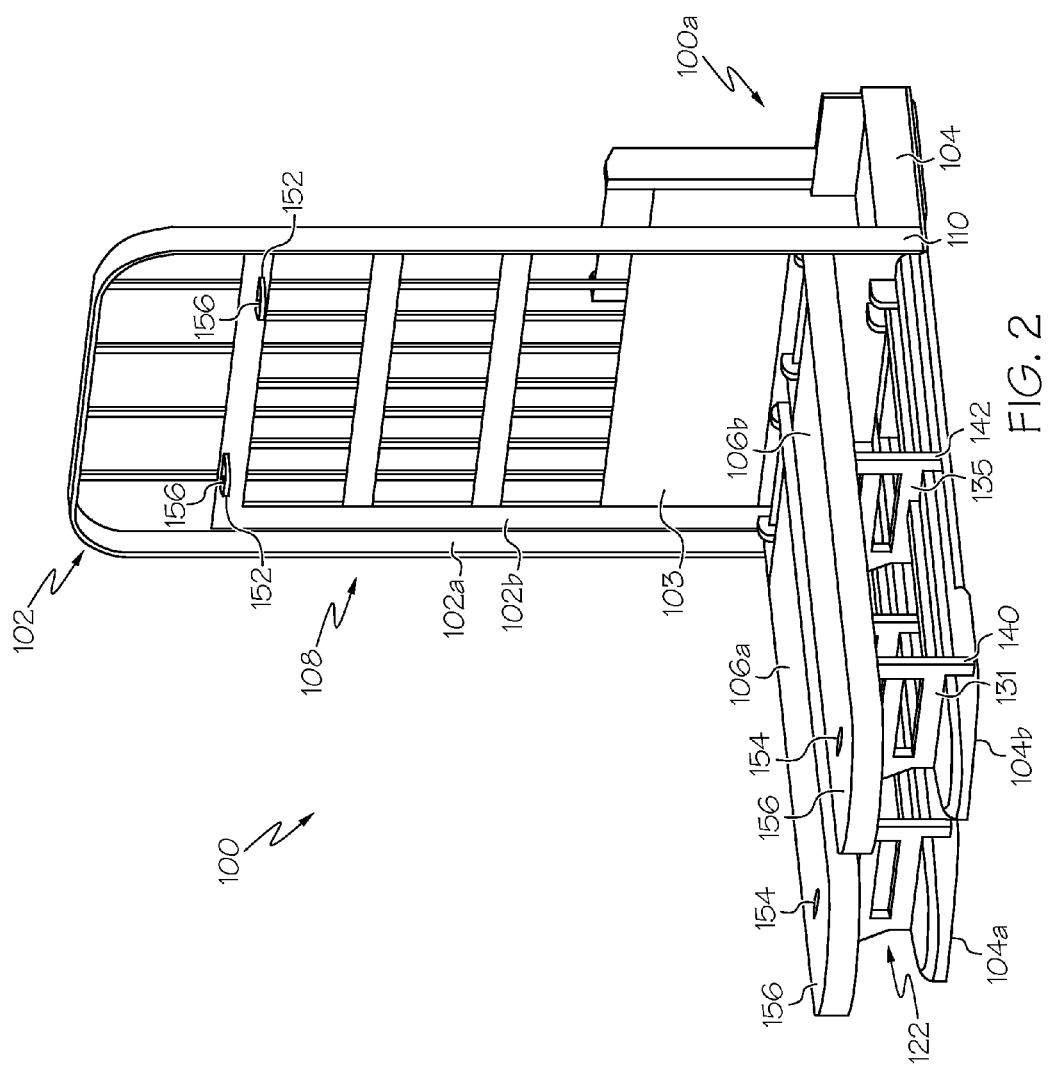
FIG. 2 is a perspective view of the backrest assembly of FIG. 1 wherein the second half-size pallet support has been extended over a second one of the truck's forks so that both supports extend over the first and second forks respectively.
Figure 3:
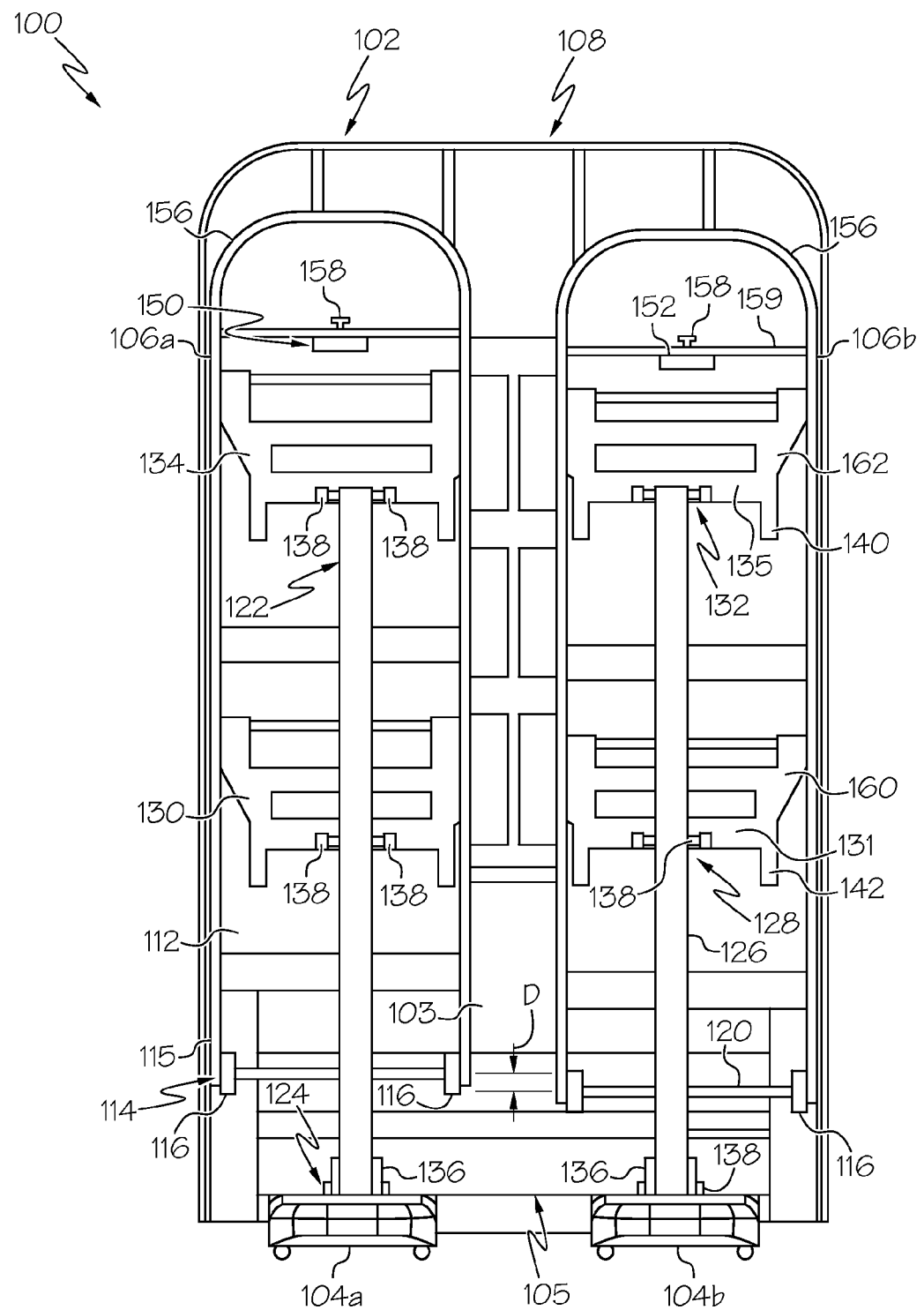
FIG. 3 is a front view of the backrest assembly of FIG. 1 wherein both the first and second half-size pallet supports are secured against the backrest.

FIGS. 1-5 show a backrest assembly 100 for a pallet truck 100*a* generically represented by a fork weldment 104 and first and second forks 104*a*, 104*b* generally fixed to and extending substantially perpendicularly from the fork weldment 104. The backrest assembly 100 may be mounted to the pallet truck 100*a*, for example, by securing a backrest 102 of the backrest assembly 100 to a battery wall 103 of the pallet truck 100*a* with which the backrest assembly 100 is to be used. The backrest assembly 100 enables an associated pallet truck 100*a* to handle both industry standard full-size pallets and the newer half-size pallets, which are becoming more prevalent in the beverage industry, without a detachable adapter by using first and second half-size pallet supports 106a and 106b. The half-size pallet supports 106a, 106b are pivotally coupled to the backrest 102 of the backrest assembly 100 for movement between first positions against the backrest 102 as shown in FIG. 3 and second positions extending over the first and second forks 104a, 104b, respectively, as shown in FIG. 2, with transitional positions of the half-size pallet supports 106a, 106b being shown in FIG. 5. While movement of the half-size pallet supports 106a, 106b is illustrated as being manual, powered movement is within the scope of the present invention.

The pallet truck 100a may be any suitable materials handling vehicle. For example, materials handling vehicles known as rider pallet trucks for which the present invention can be used are disclosed in U.S. Pat. No. 6,595,306, which is incorporated herein by reference. Currently preferred materials handling vehicles are pallet trucks identified as Walkie Trucks for example as manufactured by Crown Equipment Corporation and identified as WP 3000 series and PW 3500 series trucks. As used herein, unless otherwise noted, the terms "vertical," "horizontal," "parallel," "perpendicular," and derivatives thereof are with reference to a centerline $CL_{100}$ of the pallet truck 100a as shown in FIGS. 1 and 5.

The half-size pallet supports 106a, 106b are each coupled to and extend from the backrest 102, which comprises a nest weldment 108 that serves both as a load backrest and as a frame for mounting and storing the half-size pallet supports 106a, 106b. In the illustrated embodiment, the nest weldment 108 may comprise, for example, an outer frame 102a and a grid structure 102b secured to the outer frame 102a such that the backrest 102 defines a recessed area or nest for receiving the first and second half-size pallet supports 106a, 106b. Because the presently disclosed half-size pallet supports 106a, 106b are integrated into the backrest 102 of the pallet truck 100a and can be stored within the nest weldment 108 when not in use, there is no need to maintain a separate storage space as required by conventional detachable or modular adapters. In addition, there is no need to interrupt load handling operations to install or remove the half-size pallet supports 106a, 106b.

Figure 4:
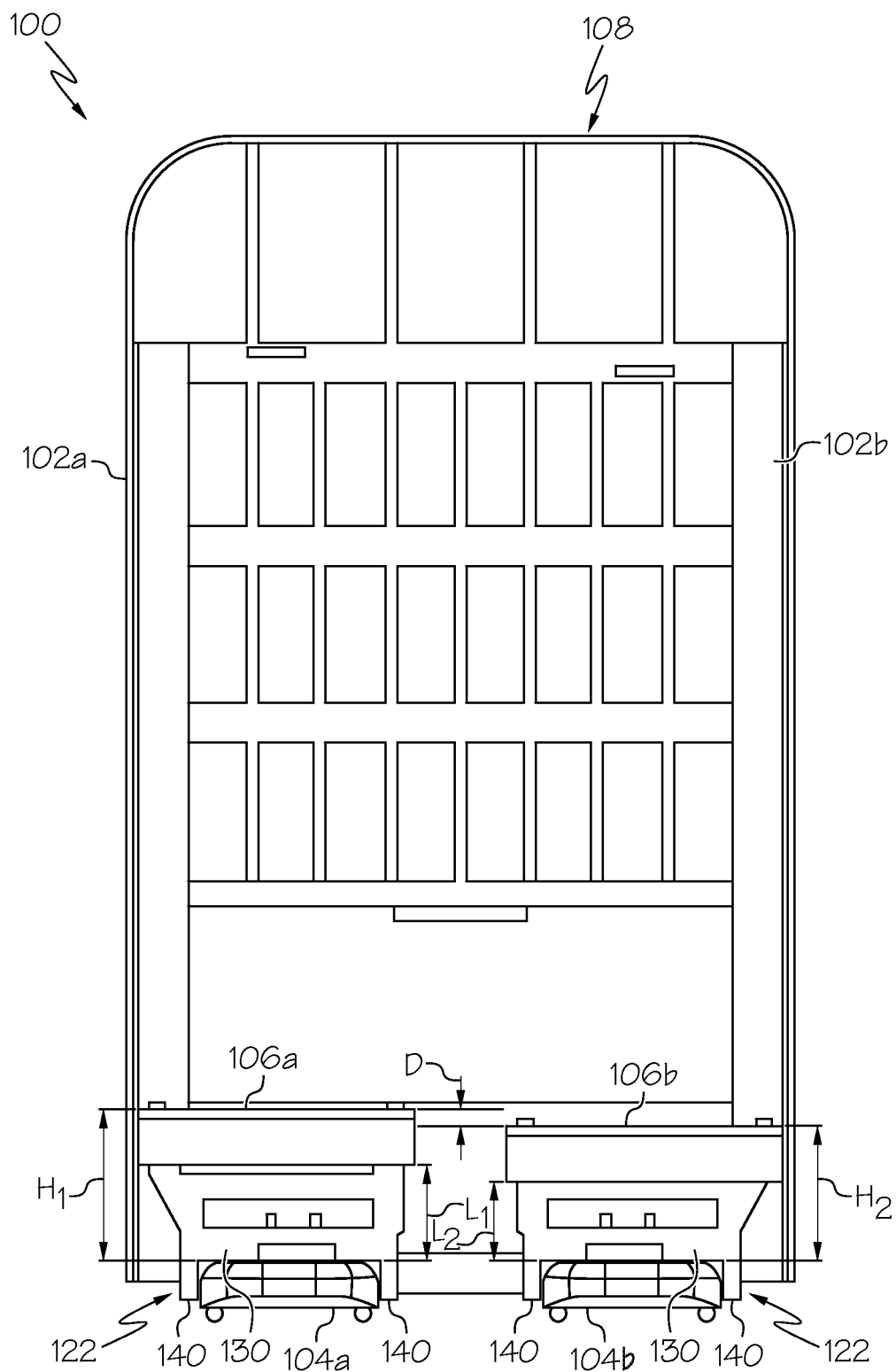
FIG. 4 is a front view of the backrest assembly of FIG. 1 wherein both the first and second half-size pallet supports are extended over the forks.
Figure 5:
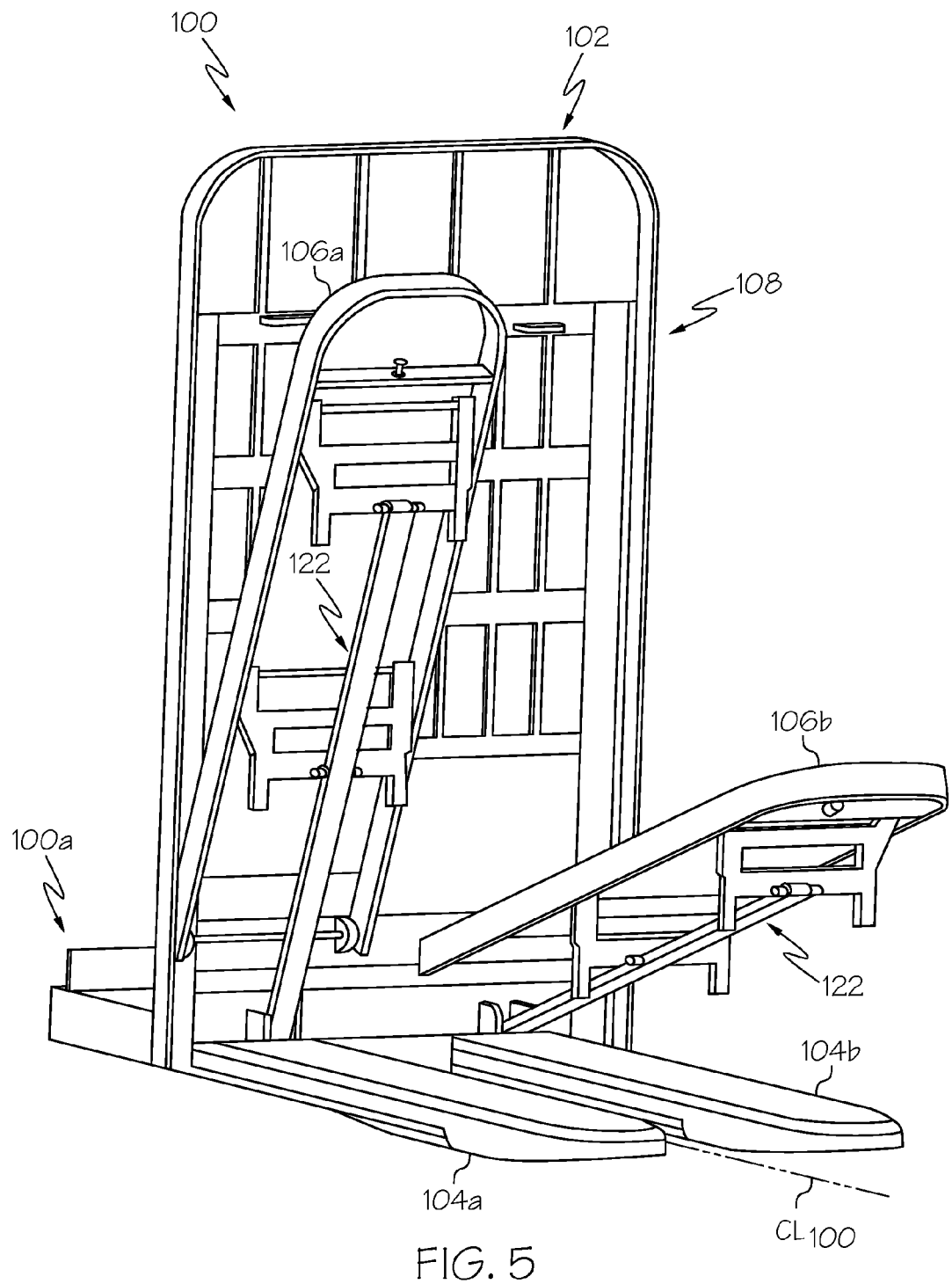
FIG. 5 is a perspective view showing transitional positions of the half-size pallet supports between first and second positions of the supports.

With continued reference to FIGS. 1-5, the half-size pallet supports 106a, 106b are pivotally coupled, such as coupling by hinges, to the backrest 102 such that the half-size pallet supports 106a, 106b may each be pivoted from a first position to a second position. In the first position, the half-size pallet supports 106a, 106b are generally perpendicular to the centerline $CL_{100}$ and to the forks 104a, 104b and are resting against and retained within the nest weldment 108 of the backrest 102. In the second position, the half-size pallet supports 106a, 106b are generally parallel to centerline $CL_{100}$ and extend horizontally over the forks 104a, 104b. In order to illustrate different aspects of the currently preferred embodiment shown in FIG. 1, one of the half-size pallet supports 106a is shown in its second position extended over the fork 104a, and the other half-size pallet support 106b is shown in its first position secured to the backrest 102. In FIGS. 2 and 4, both half-size pallet supports 106a, 106b are shown in their second positions extending over their respective forks 104a, 104b, while both half-size pallet supports 106a, 106b are shown in their first positions in FIG. 3. FIG. 5 illustrates transitional positions of the half-size pallet supports 106a, 106b pivoting between their first and second positions.

As best seen in FIGS. 1 and 3, each of the half-size pallet supports 106a, 106b may be hingedly coupled to the backrest 102. In the illustrated embodiment, a proximal or first end 112 of each half-size pallet support 106a, 106b comprises extensions 115 secured to the backrest 102 via a lower end pivot assembly 114. The lower end pivot assembly 114 comprises two pivot tabs 116 extending from the backrest 102. An axle 120 extends between the respective pair of pivot tabs 116 and through apertures in the extensions 115 of the half-size pallet supports 106a, 106b so that the half-size pallet supports 106a, 106b can pivot between their first and second positions.

With continued reference to FIGS. 1 and 3, the backrest assembly 100 further comprises first and second prop assemblies 122 that further couple the half-size pallet supports 106a, 106b to the backrest 102 and provide longitudinal support for the half-size pallet supports 106a, 106b when they are extended in their second positions over the forks 104a, 104b, respectively. The prop assemblies 122 each comprise a lower pivot assembly 124, a control rod or rail 126, a middle pivot assembly 128 coupled to a first prop leg 130, and an upper pivot assembly 132 coupled to a second prop leg 134. The lower pivot assembly 124 comprises lower pivot tabs 136 that secure a proximal or first end of the rail 126 via axles 138 extending through the tabs 136 and apertures through the first end of the rail 126. In the embodiment depicted in FIG. 1, it can be seen that one portion of the lower pivot tabs 136 may form a substantially 90 degree angle such that one surface of each lower pivot tab 138 is secured to the backrest 102 and one surface rests against or can be secured to the forks 104a, 104b to provide additional stability and strength.

As shown in FIG. 3, the first prop leg 130 comprises a crossbar 131 to which the middle pivot assembly 128 is coupled, and the second prop leg 134 comprises a crossbar 135 to which the upper pivot assembly 132 is coupled. The middle pivot assembly 128 comprises an axle 138 that secures a middle portion of the rail 126 to the crossbar 131 of the first prop leg 130, and the upper pivot assembly 132 comprises an axle 138 that secures a distal or second end of the rail 126 to the crossbar 135 of the second prop leg 134. First ends 160, 162 of the first and second prop legs 130, 134 are each pivotally coupled to their respective half-size pallet supports 106a, 106b, such as via a hinge using axles and apertures as illustrated or other suitable hinging structure.

With reference to FIGS. 1-5, as the half-size pallet supports 106a, 106b move between their first positions against the backrest 102 and their second positions extending over the forks 104a, 104b, the lower end pivot assemblies 114 and the lower, middle, and upper pivot assemblies 124, 128, 132 cooperate with the rail 126 to pivot the first and second prop legs 130, 134 about their hinged connections to the half-size pallet supports 106a, 106b between collapsed positions shown in FIG. 3 and extended or deployed positions shown in FIGS. 2 and 4. FIG. 5 shows two exemplary intermediate positions of the half-size pallet supports 106a, 106b. In their collapsed positions, the prop legs 130, 134 are received within a recessed or hollow portion defined in an underside of each half-size pallet support 106a, 106b and are substantially parallel to the half-size pallet supports 106a, 106b. In their extended positions, the prop legs 130, 134 are substantially perpendicular to the half-size pallet supports 106a, 106b and the forks 104a, 104b and extend therebetween to support the half-size pallet supports 106a, 106b on the forks 104a, 104b.

As seen in FIGS. 2-4, the first and second prop legs 130, 134 terminate in brackets defined by extensions 140, 142 and the crossbars 131, 135 from which the extensions 140, 142 extend for receiving the forks 104a, 104b. When the half-size pallet supports 106a, 106b are in their second positions extended over their respective forks 104a, 104b, the crossbars 131, 135 of the prop legs 130, 134 engage and are supported by the upper or support surfaces of the forks 104a, 104b, with the extensions 140, 142 extending downward along the sides of the forks 104a, 104b. The extensions 140, 142 lock the half-size pallet supports 106a, 106b in place to prevent side-to-side movement of the half-size pallet supports 106a, 106b.

With reference to FIGS. 1-3, the backrest assembly 100 further comprises first and second latching assemblies 150 that secure a distal or second end 156 of each half-size pallet support 106a, 106b to the nest weldment 108 of the backrest 102 when stored and not in use. In the illustrated embodiment, each of the latching assemblies 150 comprises a backrest latch member and an inter-mating support latch member. Each backrest latch member comprises, for example, a latch tab 152 extending from the nest weldment 108 of the backrest 102. Each inter-mating support latch member comprises, for example, a cross member 159 formed on a bottom surface of each of the half-size pallet supports 106a, 106b and a locking pin 158 that is supported on one surface of each cross member 159. Each latch tab 152 includes an aperture for receiving the locking pin 158. The locking pins 158 are preferably biased to extend into the apertures of the latch tabs 152, for example, by related springs (not shown). When the half-size pallet supports 106a, 106b are in the first position resting against the backrest 102 as shown in FIGS. 1 and 3, the latch tab 152 extends through a slot 154 located near the second end 156 of each half-size pallet support 106a, 106b such that the latch tab 152 is adjacent to the cross member 159 and such that the aperture in the latch tab 152 aligns with the locking pin 158 supported on the cross member 159. The locking pin 158 is then received in the aperture of each latch tab 152 to secure the half-size pallet supports 106a, 106b to the backrest 102.

As best seen in FIGS. 2-4, one of the half-size pallet supports 106a is mounted to the pallet truck 100a at a different height relative to the other half-size pallet support 106b to allow the operator to drop off/pick up one half-size pallet at a time and to pick up a specific half-size pallet among several half-size pallets stacked side-by-side. In the illustrated embodiment, the first half-size pallet support 106a is mounted to the pallet truck 100a at a higher location on the backrest 102 than the second half-size pallet support 106b such that the first half-size pallet support 106a is also referred to herein as the higher half-size pallet support 106a and the second half-size pallet support 106b is also referred to as the lower half-size pallet support 106b. As seen in FIG. 3, the lower end pivot assembly 114 of the higher half-size pallet support 106a is mounted to the backrest 102 at a location that is vertically higher than the location of a mounting point of the lower end pivot assembly 114 of the lower half-size pallet support 106b by a distance D. The respective locations and heights of the lower end pivot assemblies 114 as described herein are with reference to a vertical distance from a bottom surface 105 of the backrest 102 as shown in FIG. 3. The distance D may be approximately one inch although other distances may be used and still be in accordance with the teachings of the present application.

With reference to FIG. 4, when the half-size pallet supports 106a, 106b are in their second positions extended over the forks 104a, 104b, respectively, the higher half-size pallet support 106a has a first support surface height $H_1$ measured from the support surface of the fork 104a to the top surface of the half-size pallet support 104a, and the lower half-size pallet support 106b has a second support surface height $H_2$ measured from the support surface of the fork 104b to the top surface of the half-size pallet support 104b, with the height difference being equivalent to the distance D between the locations of the mounting points of the two lower end pivot assemblies 114 as shown in FIG. 3 (see also FIG. 2).

To accommodate for the difference in the location of the mounting points of the two lower end pivot assemblies 114, the prop legs 130, 134 of the higher half-size pallet support 106a are longer than the prop legs of the lower half-size pallet support 106b. With continued reference to FIG. 4, the first prop leg 130 of the higher half-size pallet support 106a has a length $L_1$ measured from the bottom surface of the higher pallet support 106a to the support surface of the fork 104a, and the first prop leg of the lower half-size pallet support 106b has a length $L_2$ measured from the bottom surface of the lower pallet support 106b to the support surface of the fork 104b, with the length difference being equivalent to the distance D between the location of the mounting points of the two lower end pivot assemblies 114 (see also FIG. 2). It is noted that lengths $L_1$ and $L_2$ may also be measured from the first end 160 of each of the first prop legs 134 to the support surface of the respective fork 104a, 104b. The respective second prop legs 134 of each of the higher and lower half-size pallet supports 106a, 106b have a similar relationship best seen in FIG. 3. The distance D between the locations of the mounting points of the two lower end pivot assemblies 114 may be one inch so that $H_1$ is one inch greater than $H_2$ and $L_1$ is one inch greater than $L_2$ although other distances may be used as will be apparent to those skilled in the art. By adjusting only the mounting points of the two lower end pivot assemblies 114 and the length of the respective first and second prop legs 130, 134, the higher and lower half-size pallet supports 106a, 106b may be otherwise substantially identical in configuration and size. In addition, both half-size pallet supports 106a, 106b may use rails 126 of substantially the same dimensions. Although the first half-size pallet support 106a is currently illustrated as being mounted higher than the second half-size pallet support 106b, it is understood that the second half-size pallet support 106b could be mounted higher than the first half-size pallet support 106a.

The presently disclosed half-size pallet supports 106a, 106b may be used in their second extended positions in combination or one at a time. The ability to quickly pivot the half-size pallet supports 106a, 106b from their extended positions to their collapsed positions enables the pallet truck 100a to carry standard, full-size pallets, as well as newer, half pallets that are increasingly used in the beverage industry. As best seen in FIGS. 1 and 3, the nest weldment 108 of the backrest 102 may comprise a recessed portion into which the half-size pallet supports 106a, 106b are retained such that the bottom surfaces of the half-size pallet supports 106a, 106b are flush with the backrest 102 when the half-size pallet supports 106a, 106b are in the first position secured against the backrest 102.

As previously described, each half-size pallet support 106a, 106b may comprise a recessed portion into which the first and second prop legs 130, 134 are retained in their collapsed position. In this way, the half-size pallet supports 106a, 106b and all associated components are stored in place and may further act as a load backrest to protect the operator and pallet truck 100a from a toppling or scattering pallet load, which is particularly important in beverage industry applications. The presently disclosed half-size pallet supports 106a, 106b may be incorporated into many existing pallet trucks, including existing load backrest designs. Furthermore, because the half-size pallet supports 106a, 106b fold up into the backrest 102, the half-size pallet supports 106a, 106b may be sized to fit existing forks 104a, 104b with no fork length loss.

A mechanism may be provided to assist an operator in lifting the half-size pallet supports 106a, 106b from their second positions extended over the forks 104a, 104b to their first positions against the backrest 102. The mechanism also assists in controlling movement of the half-size pallet supports 106a, 106b and preventing them from slamming down against the forks 104a, 104b when being lowered into their second positions extending over the forks 104a, 104b. An exemplary lift/lower operator assistance mechanism is shown in FIGS. 6A-C as comprising two gas springs 170 mounted beneath each of the half-size pallet supports 106a, 106b to offset or support some of the weight of the half-size pallet supports 106a, 106b and to provide additional control over movement of the half-size pallet supports 106a, 106b.

First ends 170a of the gas springs 170 are pivotally coupled to tabs 172 extending from the underside 174 of each half-size pallet support 106a, 106b. The second end 170b of each gas spring 170 is coupled to its corresponding one of the rails 126. The tabs 172 and rails 126 include apertures 176, shown only on the pivot tabs 172, that receive rods to secure the ends 170a, 170b of the gas springs 170 to the pivot tabs 172 and the rails 126 to enable the ends 170a, 170b of the gas springs 170 to pivot or rotate as the half-size pallet supports 106a, 106b are moved between their first and second positions. The tabs 172 are located between the points at which the first ends 160, 162 of each of the first and second prop legs 130, 134 are coupled to the respective half-size pallet supports 106a, 106b with the specific location depending on the size of the gas springs 170 used in a given application.

Figure 6A:
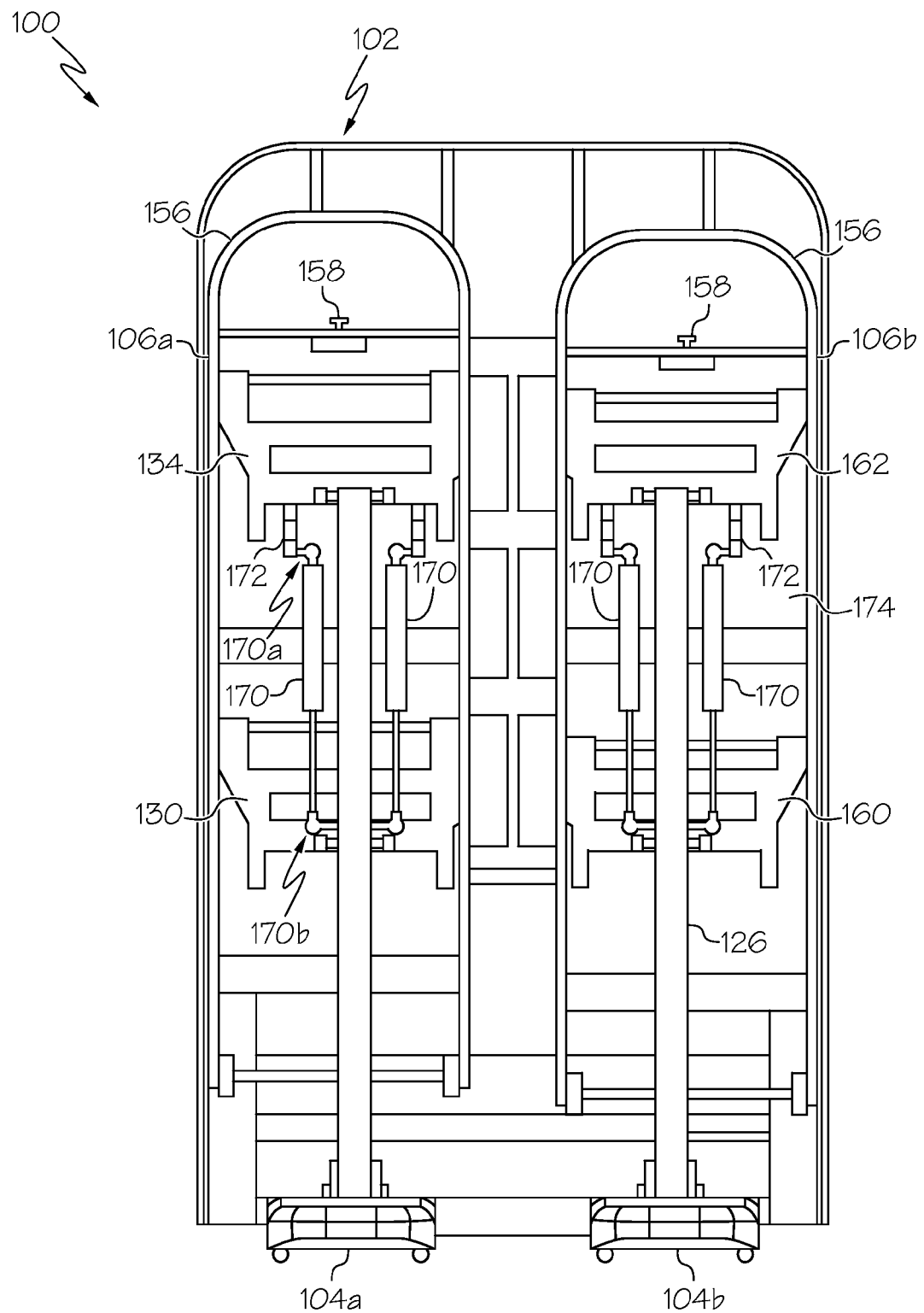
FIG. 6A is a front view similar to FIG. 3 of a backrest assembly in accordance with the teachings of the present application wherein both half-size pallet supports are secured against the backrest and each half-size pallet support further comprises a half-size pallet support lift/lower operator assistance mechanism.
Figure 6B:
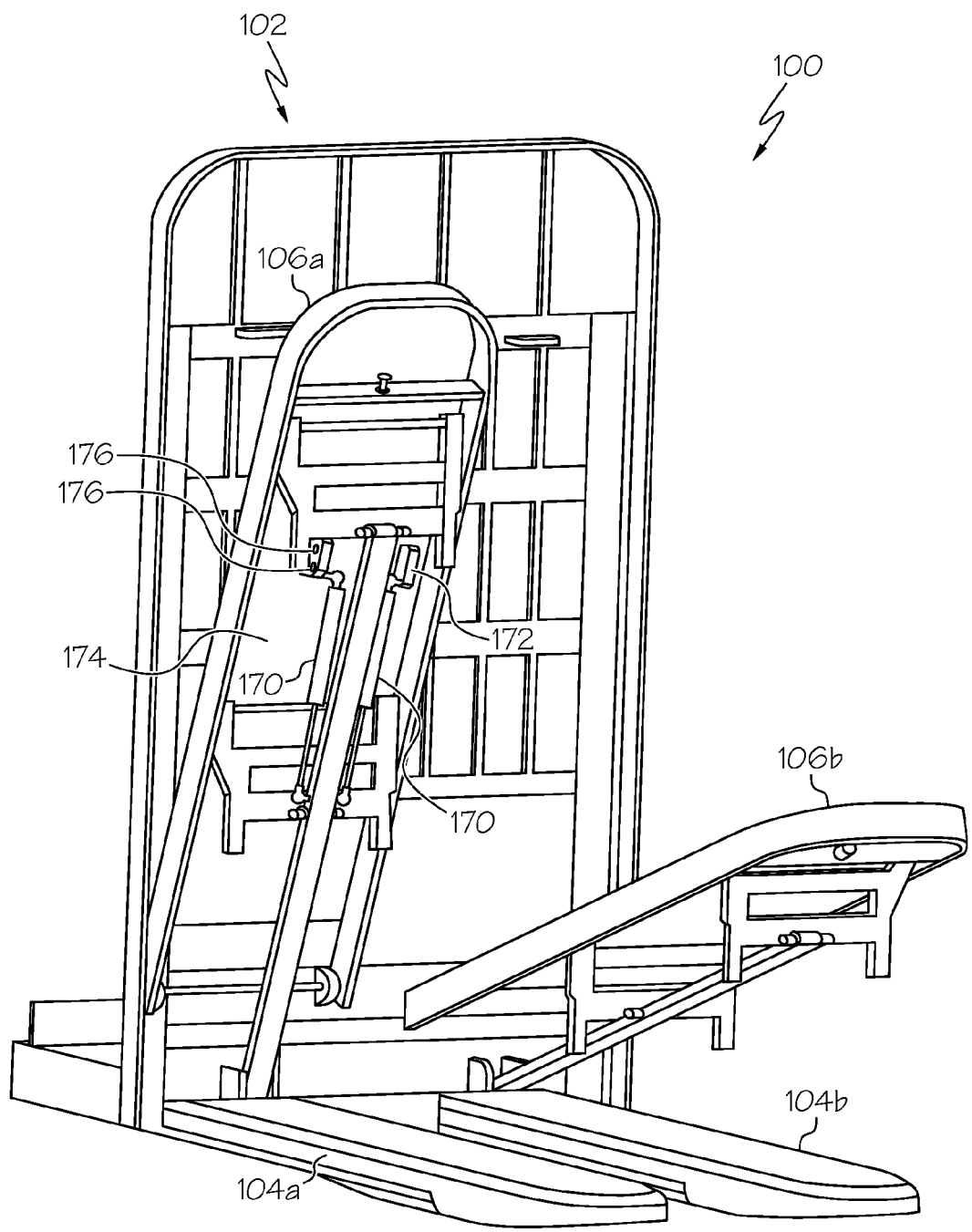
FIG. 6B is a perspective view showing transitional positions of the half-size pallet supports of FIG. 6A between first and second positions of the supports.

In FIG. 6A, both half-size pallet supports 106a, 106b are shown in their first positions stored in the backrest 102 so that the gas springs 170 are extended. When the half-size pallet supports 106a, 106a are in the first position, the second ends of the gas springs 170 that is coupled to the rail 126 is located toward the backrest 102, i.e., away from the second end 156 of the half-size pallet supports 106a, 106b, with respect to the location of the tabs 172. FIG. 6B illustrates movement of the half-size pallet supports 106a, 106b between their first positions and their second positions with the gas springs 170 being shown only on half-size pallet support 106a. The first and second ends 170a, 170b of the gas springs 170 pivot about their support rods such that the second ends 170b of the gas springs 170 move with the rail 126 as the first and second prop legs 130, 134 pivot about their hinged connections to move between their collapsed positions and their extended positions.

Figure 6C:
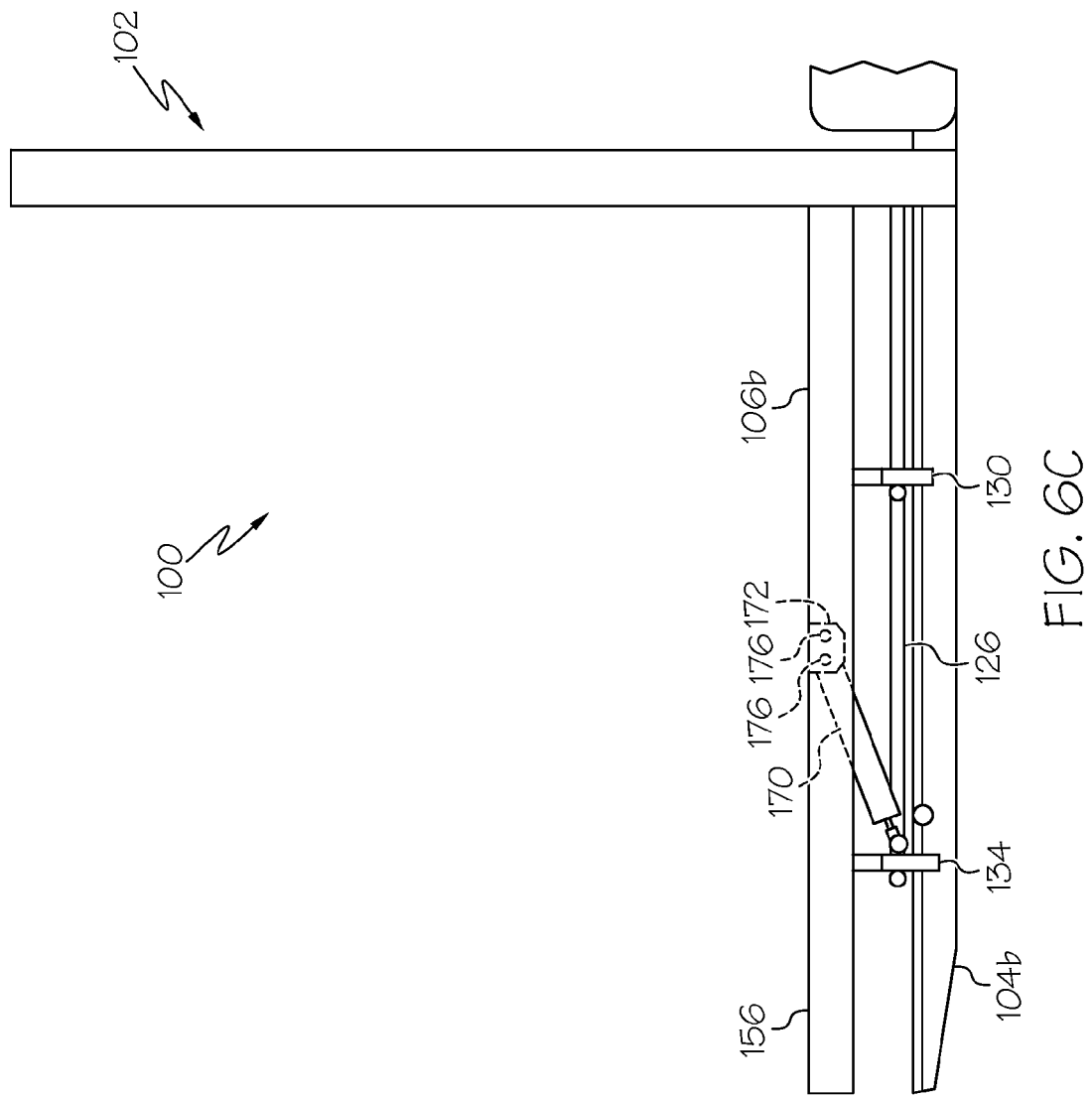
FIG. 6C is a side view of one of the half-size pallet supports of FIGS. 6A and 6B in their second positions extended over the forks.

In FIG. 6C, the half-size pallet support 106b is shown from the side in its second position extended over the fork 104b with the first and second prop legs 130, 134 in their extended positions. Portions of the gas springs 170 and the pivot tabs 172 are hidden in the underside of the half-size pallet support 106b and are indicated with dashed lines. The gas springs 170 have pivoted and compressed such that the second end 170b of each gas spring 170 is now located away from the backrest 102, i.e., toward the second end 156 of the half-size pallet support 106b, with respect to the location of the pivot tabs 172.

It will be apparent to those of skill in the art that the gas springs 170 may comprise varying sizes and configurations to provide sufficient operator assistance during movement of the half-size pallet supports 106a, 106b. Varying numbers of gas springs 170 may also be used and the attachment points may be altered to achieve the desired level of support and control over the movement of the half-size pallet supports 106a, 106b. In addition, other suitable assistance mechanisms may be used, including, but not limited to mechanical springs, hydraulic cylinders or dampers, pneumatic actuators, electric motors and the like for assisting the operator in raising and/or lowering the half-size pallet supports 106a, 106b.

Figure 7A:
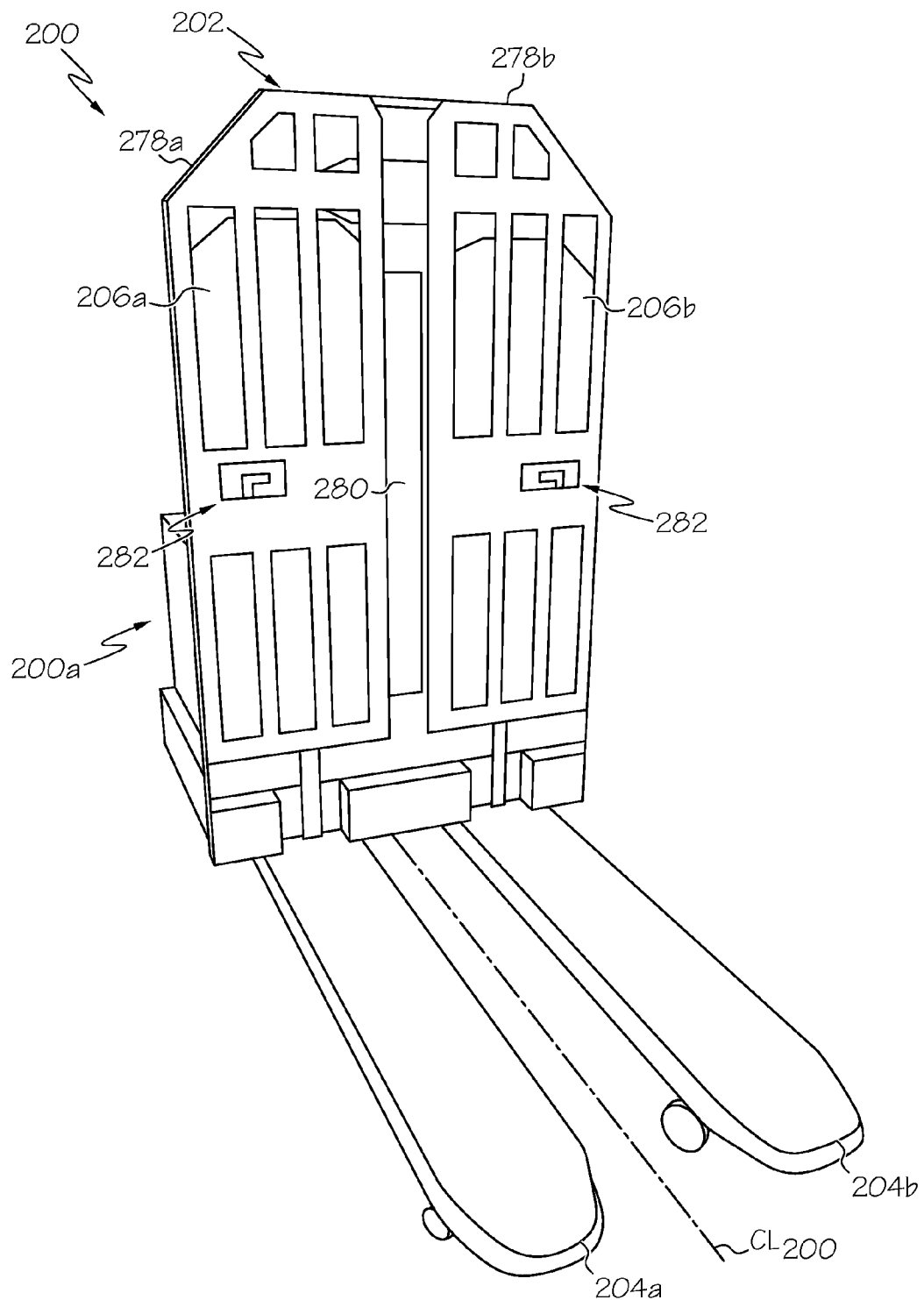
Figure 7B:
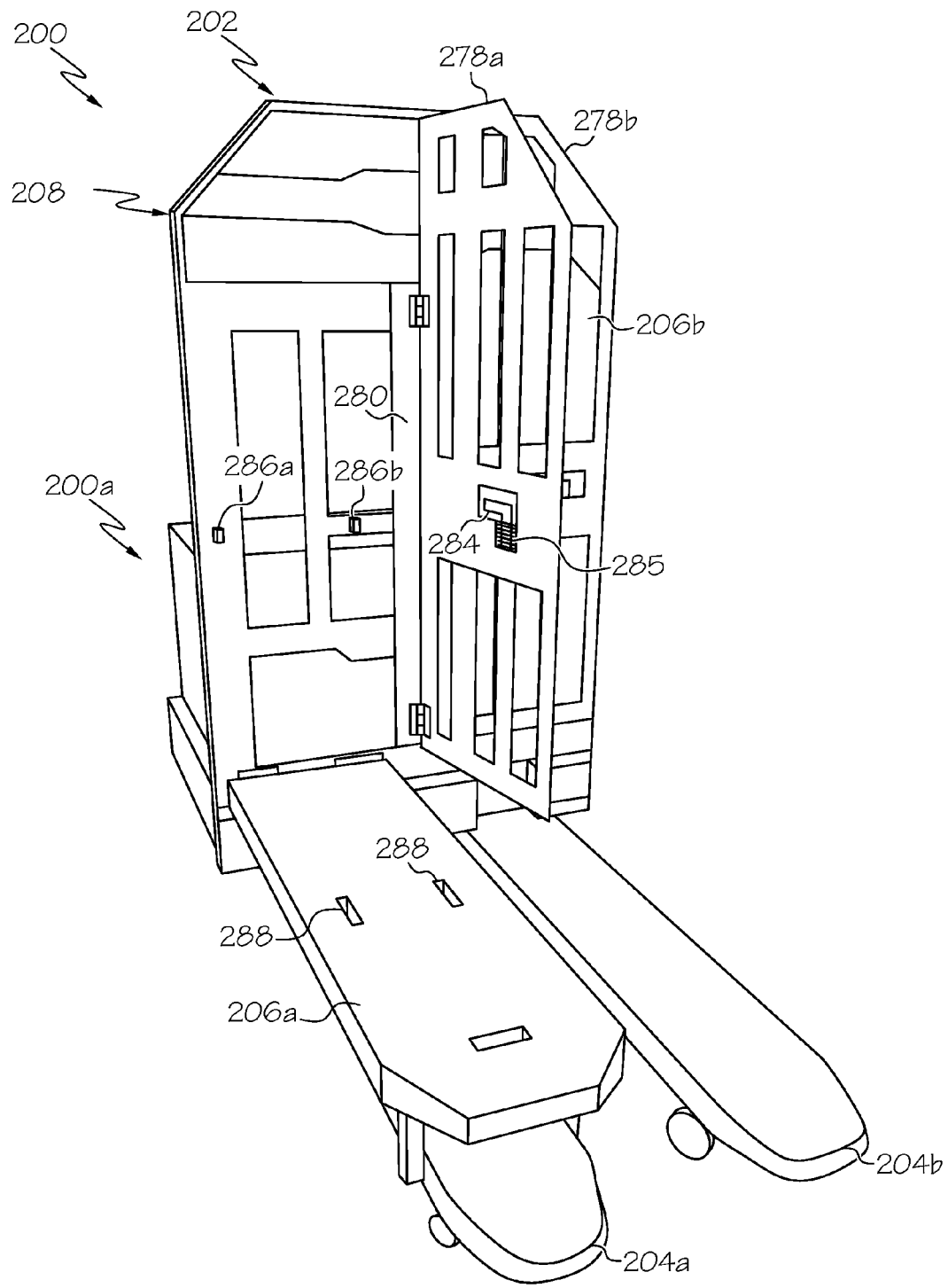
Figure 7C:
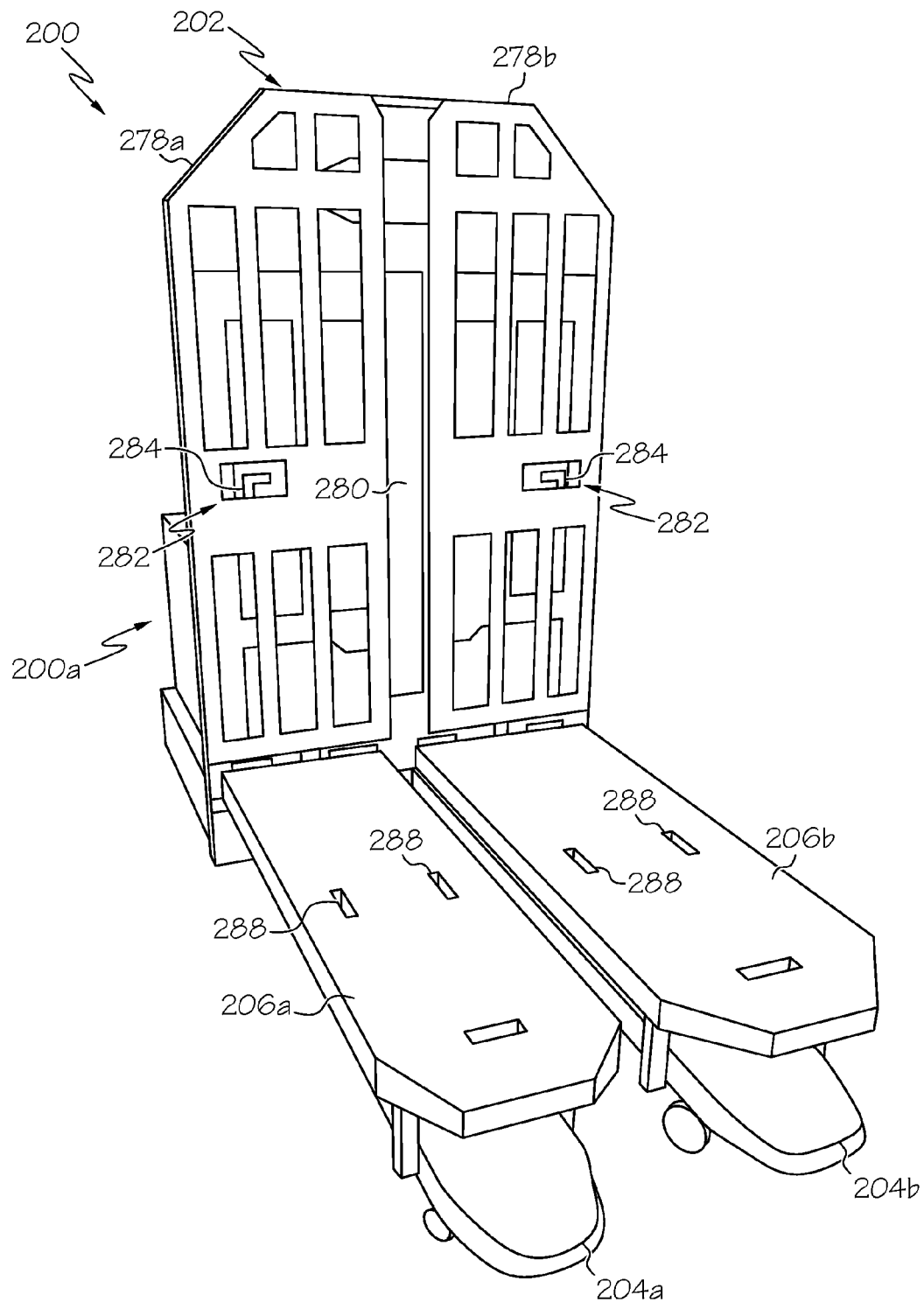

FIGS. 7A-7D illustrate a backrest assembly 200 for a pallet truck 200a including first and second doors 278a, 278b that may be used to enclose and secure first and second half-size pallet supports 206a, 206b. In FIG. 7A, both half-size pallet supports 206a, 206b are in a first position against a backrest 202 and the doors 278a, 278b are in a closed position. In FIG. 7B, the first door 278a has been moved to an open position to allow the first half-size pallet support 206a to be moved from its first position against the backrest 202 to a second position extended over a first fork 204a as described herein. In FIG. 7C, both half-size pallet supports 206a, 206b are in their second positions extended over the first and second forks 204a, 204b and both doors 278a, 278b are in their closed position. The pallet truck 200a, backrest assembly 200, and half-size pallet supports 206a, 206b shown in FIGS. 7A-7D may correspond to the pallet truck 100a, backrest assembly 100, and half-size pallet supports 106a, 106b described herein and although not labeled in FIGS. 7A-7D, may include one or more of the associated features described herein. As used herein, the terms "forward," "front," and derivatives thereof refer to a direction toward the forks 204a, 204b, while the terms "back," "rear," and derivatives thereof refer to a direction away from the forks 204a, 204b.

As shown in FIG. 7B, the first and second doors 278a, 278b are movably coupled to the backrest 202 such that they each have an open position and a closed position and such that the first and second doors 278a, 278b enclose the first and second half-size pallet supports 206a, 206b, respectively. Each door 278a, 278b may be, for example, coupled to a central column 280 of the backrest 202 using two hinges (not labeled). The central column 280 may be secured to one or both of an outer frame 202a and a nest weldment 208 of the backrest 202, see FIG. 7D. The central column 280 extends vertically above the first and second forks 204a, 204b and is located along a centerline $CL_{200}$ of the pallet truck 200a. The half-size pallet supports 206a, 206b may be positioned on either side of the central column 280. When the doors 278a, 278b are in their closed positions, the doors 278a, 278b are substantially parallel to the backrest 202 as shown in FIGS. 7A, 7C, and 7D. Each of the doors 278a, 278b opens toward the centerline $CL_{200}$ of the pallet truck 200a when the door 278a, 278b is moved from its closed to its open position. The doors 278a, 278b pivot about an axis that is substantially perpendicular to axes about which the first end 112 of the first and second pallet supports 106a, 106b and the first end of the rail 126 pivot, as seen in FIG. 1.

Each door 278a, 278b comprises a handle assembly 282 that secures the door 278a, 278b to the backrest 202 in the closed position. Each handle assembly 282 may comprise, for example, a handle 284 with a latching portion (not separately labeled) and a first tab 286a, also referred to herein as a door latch tab 286a, which extends from the backrest 202. The handle 284 may be recessed such that it does not extend beyond a forward surface of the doors 278a, 278b. The latching portion of the handle 284 engages a slot (not separately labeled) formed in the door latch tab 286a.

The handle 284 may comprise a biasing member 285, such as a spring, that biases the handle 284 to engage the slot in the door latch tab 286a. With reference to the first half-size pallet support 206a as shown in FIGS. 7A and 7B, the half-size pallet support 206a comprises an opening 288 formed through a thickness of the half-size pallet support 206a and aligned with a location of the door latch tab 286a on the backrest 202. It can be seen that when the half-size pallet support 206a is in its first position against the backrest 202 and the first door 278a is in its closed position, the door latch tab 286a extends through the opening 288, and the handle 284 engages the door latch tab 286a extending through the opening 288 in the half-size pallet support 206a to secure the door 278a and the half-size pallet support 206a to the backrest.

To open the first door 278a, the operator may, for example, access the handle 284 via an opening formed in the door 278a and pull up on the handle 284 to disengage the latching portion from the door latch tab 286a and release the door 278a. The operator then swings the door 278a away from the backrest 202 and toward the centerline $CL_{200}$ of the pallet truck 200a as shown in FIG. 7B so that the door 278a pivots from its closed position to its open position. Once the door 278a is opened, the first half-size pallet support 206a may be moved from its first position against that backrest 202 into its second position extending over the first fork 204a. The doors 278a, 278b may be used in conjunction with, for example, a latching assembly 150 as described herein to secure the half-size pallet supports 206a, 206b in the first position against the backrest 202. Because the doors 278a, 278b open toward the centerline $CL_{200}$, the operator is able to access each half-size pallet support 206a, 206b by standing on either side of the forks 204a, 204b with no need to stand between the forks 204a, 204b or otherwise in the path of travel of the pallet truck 200a in the forks-first direction. Although not shown, it is understood that the doors 278a, 278b may also be movably coupled to a portion of the outer frame 202a so that the doors 278a, 278b open away from the centerline $CL_{200}$ of the pallet truck 200a.

To close the doors 278a, 278b, the operator swings each door 278a, 278b toward the backrest 202 so that the latching portion of each handle 284 reengages the corresponding door latch tab 286a. The operator may, for example, lift up the handle 284 while closing the doors 278a, 278b until the latching portion and corresponding slot in each door latch tab 286a align, after which the operator releases the handle 284 and the latching portion engages the corresponding slot to lock the doors 278a, 278b in place. Alternatively, the operator may simply move the doors 278a, 278b toward the backrest 202 until the latching portion of the handle 284 contacts the door latch tab 286a. A forward surface of the door latch tab 286a may be angled such that the latching portion of handle 284 slides along the angled surface, moving the handle 284 upward and compressing the spring 285. The operator continues to press the door 278a, 278b toward the backrest 202 until the latching portion is aligned with the slot in the corresponding door latch tab 286a, after which the spring 285 exerts a force to bias the latching portion of the handle 284 into engagement with the slot. Although not shown, it is understood that the second door 278b may be opened and closed in a similar manner, and the second half-size pallet support 206b may similarly be secured against the backrest 202 and moved from a first position to a second position. As shown in FIG. 7D, the doors 278a, 278b are positioned vertically along the backrest 202 to allow sufficient clearance to close the doors 278a, 278b when the first and second half-size pallet supports 206a, 206b are in their second positions.

Similar to the backrest assembly 100 shown in FIGS. 1 and 3, the nest weldment 208 of the backrest 202 shown in FIGS. 7A-7D may comprise a recessed portion into which the half-size pallet supports 206a, 206b are retained such that the bottom surfaces of the half-size pallet supports 206a, 206b are flush with a forward surface of the backrest 202 when the half-size pallet supports 206a, 206b are in their first position secured against the backrest 202. In addition, the doors 278a, 278b may be formed to correspond to the shape and size of the backrest assembly 200 such that the doors 278a, 278b form a portion of the backrest 202 that faces toward the forks 204a, 204b. For example, as shown in FIGS. 7A, 7C, and 7D, the doors 278a, 278b are formed to align with and conform to a shape defined by an outline of the outer frame 202a of the backrest 202 and the doors 278a, 278b rest against the forward surface of the backrest 202. When the half-size pallets 206a, 206b are stowed in the first position, the doors 278a, 278b protect the components on the underside of each half-size pallet 206a, 206b from being damaged by a load 290 carried on the forks 204a, 204b. The doors 278a, 278b also protect the load 290 being carried on the forks 204a, 204b from being damaged by any components of the half-size pallet supports 206a, 206b. Furthermore, when in their closed position, the doors 278a, 278b provide a large load support surface to stabilize and support the load 290 as shown in FIGS. 7A, 7C, and 7D, regardless of whether the half-size pallets 206a, 206b are in their first or second position. The handle assemblies 282 may be formed to extend away from the forks 204a, 204b into a recessed or hollow portion defined in an underside of each half-size pallet support 206a, 206b so that the load support surface formed by the doors 278a, 278b is substantially planar.

In some embodiments, the backrest 202 may further comprise a second tab 286b that is located toward the centerline $CL_{200}$ of the pallet truck 200a as shown in FIG. 7B. Each half-size pallet support 206a, 206b may comprise two openings 288 that are formed through a thickness of the half-size pallet support 206a, 206b and aligned with a location of each of the first and second tabs 286a, 286b on the backrest 202. With reference to FIGS. 7A and 7B, it can be seen that when the half-size pallet support 206a is in its first position against the backrest 202, the tabs 286a, 286b extend through a respective one of the two openings 288. The shape, size, and location of the tabs 286a, 286b on the backrest 202 and the placement of the openings 288 in the half-size pallet supports 206a, 206b may be such that the half-size pallet supports 206a, 206b may be interchanged from one side of the pallet truck 200a to the other side as needed. Similar to the first tab 286a, the second tab 286b may also comprise a slot for engaging the latching portion of a handle (not shown).

In addition, the tabs 286a, 286b may be configured to provide support for the doors 278a, 278b and to stabilize the load support surface formed by the closed doors 278a, 278b. For example, when the doors 278a, 278b are in their closed position, a forward surface of the tabs 286a, 286b may be adjacent to or in contact with a back surface of the doors 278a, 278b so that if an object such as a pallet impacts the doors 278a, 278b, the tabs 286a, 286b provide additional support and may help to prevent the doors 278a, 278b from bending or warping as a result of the impact. If the half-size pallet supports 206a, 206b are in their first position against the backrest 202 with the tabs 286a, 286b extending through the openings 288, the tabs 286a, 286b may also help to prevent the doors 278a, 278b from contacting and/or damaging the half-size pallet supports 206a, 206b.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A pallet truck backrest assembly for handling half-size pallets comprising:
   a backrest attachable to a pallet truck and extending above a first fork and a second fork of the pallet truck,
   a first half-size pallet support pivotally coupled to the backrest at a first height relative to a bottom surface of the backrest, the first half-size pallet support pivoting between a first position against the backrest and a second position extending over the first fork of the pallet truck at a first support surface height; and
   a second half-size pallet support pivotally coupled to the backrest at a second height relative to the bottom surface of the backrest, the second height being less than the first height, the second half-size pallet support pivoting between a first position against the backrest and a second position extending over the second fork of the pallet truck at a second support surface height;
   wherein the backrest comprises:
      an outer frame;
      a grid structure secured to the outer frame such that the backrest defines a nest weldment for receiving the first and second half-size pallet supports;
      a first door movably coupled to the backrest and having a closed position and an open position, wherein the first door encloses the first half-size pallet support when the first half-size pallet support is in the first position against the backrest; and
      a second door movably coupled to the backrest and having a closed position and an open position, wherein the second door encloses the second half-size pallet support when the second half-size pallet support is in the first position against the backrest.

2. The pallet truck backrest assembly as claimed in claim 1 further comprising:
   a first latching assembly for securing the first half-size pallet support to the backrest when the first half-size pallet support is in the first position against the backrest; and
   a second latching assembly for securing the second half-size pallet support to the backrest when the second half-size pallet support is in the first position against the backrest.

3. The pallet truck backrest assembly as claimed in claim 2 wherein the first latching assembly comprises a first backrest latch member and an inter-mating first half-size pallet support latch member and the second latching assembly comprises a second backrest latch member and an inter-mating second half-size pallet support latch member.

4. The pallet truck backrest assembly as claimed in claim 1 further comprising:
   a first prop assembly movable from a collapsed position against the first half-size pallet support to a deployed position extending from the first half-size pallet support to the first fork of the pallet truck; and
   a second prop assembly movable from a collapsed position against the second half-size pallet support to a deployed position extending from the second half-size pallet support to the second fork of the pallet truck.

5. The pallet truck backrest assembly as claimed in claim 4 wherein the collapsed position of the first prop assembly is within the first half-size pallet support and the collapsed position of the second prop assembly is within the second half-size pallet support.

6. The pallet truck backrest assembly as claimed in claim 4 wherein said first prop assembly comprises:
   a first prop leg pivotally connected at a first end to the first half-size pallet support; and
   a first control rod pivotally connected to the backrest and pivotally connected to the first prop leg so that as the first half-size pallet support is pivoted from the first position to the second position, the first prop assembly is moved from the collapsed position to the deployed position; and
   said second prop assembly comprises:
   a first prop leg pivotally connected at a first end to the second half-size pallet support; and
   a second control rod pivotally connected to the backrest and pivotally connected to the second prop leg so that as the second half-size pallet support is pivoted from the first position to the second position, the second prop assembly is moved from the collapsed position to the deployed position.

7. The pallet truck backrest assembly as claimed in claim 6 wherein said first prop assembly further comprises:
   a second prop leg pivotally connected at a first end to the first half-size pallet support and pivotally connected to the first control rod so that as the first half-size pallet support is pivoted from the first position to the second position, the first prop assembly including the first prop leg and the second prop leg is moved from the collapsed position to the deployed position; and
   the second prop assembly further comprises:
   a second prop leg pivotally connected at a first end to the second half-size pallet support and pivotally connected to the second control rod so that as the second half-size pallet support is pivoted from the first position to the second position, the second prop assembly including the first prop leg and the second prop leg is moved from the collapsed position to the deployed position.

8. The pallet truck backrest assembly as claimed in claim 6 further comprising an assistance mechanism for assisting an operator of the pallet truck in moving the first and second half-size pallet supports between the first position and the second position.

9. The pallet truck backrest assembly as claimed in claim 8 wherein the assistance mechanism comprises at least one gas spring that is coupled between an underside of each of the first and second half-size pallet supports and their respective first and second control rods.

10. The pallet truck backrest assembly as claimed in claim 1 wherein the first and second doors each comprise a handle assembly, each handle assembly comprising a recessed handle attached to a respective one of the first and second doors and a first tab extending from the backrest, wherein each recessed handle engages a respective one of the first tabs to secure the first and second doors to the backrest in the closed position.

11. The pallet truck backrest assembly as claimed in claim 10 wherein the first and second half-size pallet supports each comprise a first opening extending through a thickness and corresponding to the respective first tab such that the first tabs extend through a respective one of the first openings when the first and second half-size pallet supports are in the first position against the backrest.

12. The pallet truck backrest assembly as claimed in claim 11 wherein:
   the backrest further comprises a second tab extending from the backrest; and
   the first and second half-size pallet supports each comprise a second opening extending through a thickness and corresponding to the respective second tab such that the second tabs extend through a respective one of the second openings when the first and second half-size pallet supports are in the first position against the backrest;
   wherein the first and second tabs are configured to provide support to the first and second doors when the first and second doors are in the closed position.

13. The pallet truck backrest assembly as claimed in claim 1 wherein the first and second doors are each formed to conform to a shape defined by an outline of the outer frame of the backrest.

14. The pallet truck backrest assembly as claimed in claim 1 further comprising a central column secured to at least one of the nest weldment and the outer frame and extending above the first and second forks, wherein the central column is located along a centerline of the pallet truck and is positioned between the first and second half-size pallet supports.

15. The pallet truck backrest assembly as claimed in claim 1 wherein the first and second doors are substantially parallel to the backrest when in the closed position.

16. The pallet truck backrest assembly as claimed in claim 15 wherein the first and second doors form a substantially planar load support surface when the first and second doors are in the closed position.

* * * * *

UNITED STATES PATENT AND TRADEMARK OFFICE
CERTIFICATE OF CORRECTION

PATENT NO. : 9,840,350 B2
APPLICATION NO. : 14/930960
DATED : December 12, 2017
INVENTOR(S) : Michael J. Moran et al.

It is certified that error appears in the above-identified patent and that said Letters Patent is hereby corrected as shown below:

In the Claims

Column 15, Lines 14 and 15, "wherein the first and second tabs are configured to provide support to the first and second doors when the first and" should read --wherein the first and second tabs provide support to the first and second doors when the first and--

Signed and Sealed this
Fourteenth Day of August, 2018

Andrei Iancu
*Director of the United States Patent and Trademark Office*